(12) United States Patent
Lin et al.

(10) Patent No.: US 6,473,034 B2
(45) Date of Patent: Oct. 29, 2002

(54) METHOD AND SYSTEM FOR ANTI-JAMMING SIMULATION

(75) Inventors: Ching-Fang Lin, Simi Valley, CA (US); Qiang Deng, Simi Valley, CA (US)

(73) Assignee: American GNC Corp., Simi Valley, CA (US)

( * ) Notice: Subject to any disclaimer, the term of this patent is extended or adjusted under 35 U.S.C. 154(b) by 0 days.

(21) Appl. No.: 09/957,114

(22) Filed: Sep. 19, 2001

(65) Prior Publication Data

US 2002/0053989 A1 May 9, 2002

Related U.S. Application Data
(60) Provisional application No. 60/233,788, filed on Sep. 19, 2000.

(51) Int. Cl.[7] .............................. G01S 5/02; H04B 7/185
(52) U.S. Cl. ................................................. 342/357.14
(58) Field of Search ..................... 342/357.14; 701/216, 701/220, 221

(56) References Cited

U.S. PATENT DOCUMENTS 5,790,438 A * 8/1998 Simonnet ..................... 342/165
6,127,970 A * 10/2000 Lin ........................ 342/357.14

* cited by examiner

Primary Examiner—Thomas H. Tarcza
Assistant Examiner—Fred H Mull
(74) Attorney, Agent, or Firm—Raymond Y. Chan; David and Raymond Patent Group

(57) ABSTRACT

A real time simulation method for jamming and anti-jamming evaluation of GPS systems and GPS/IMU integrated systems includes the steps of receiving real time trajectory data from a 6DOF trajectory generator and generating jamming signals, global positioning system simulated measurements, and inertial measurement unit simulated electronic signals which are injected into an on-board integrated global positioning system/inertial measurement unit system. When the on-board integrated global positioning system/inertial measurement unit system is excited in dynamic operation, a performance under various jamming conditions is able to be tested and evaluated as if carrying a real transportation test under a real jamming environment.

7 Claims, 4 Drawing Sheets

METHOD AND SYSTEM FOR ANTI-JAMMING SIMULATION

CROSS REFERENCE OF RELATED APPLICATION

This is a regular application of a provisional application having an application number of 60/233,788 and a filing date of Sep. 19, 2000.

BACKGROUND OF THE PRESENT INVENTION

1. Field of Invention

The present invention relates to a Global Positioning System (GPS) and receiver jamming and anti-jamming simulation, and more particularly to a real time simulation method and system for jamming and anti-jamming evaluation of GPS/IMU (Inertial Measurement Unit) integrated system for a hardware-in-the-loop test on the ground.

2. Description of Related Arts

The Global Positioning System (GPS) navigation satellite system was originally designed and developed to serve military needs. The GPS signal is much less susceptible to interference than a narrow-band signal due to the fact of that the GPS C/A code and P signals are both spread-spectrum signals. However, beyond a certain interference level, any radio navigation signal can be exacerbated. The ability to tolerate significant amounts of interference and hostile jamming is currently an important consideration in the design of GPS receivers and GPS/INS integrated systems.

U.S. Pat. No. 6,127,970 entitled "Coupled Real Time Emulation Method for Positioning and Location System" which is invented by the applicant of the present invention discloses a simulation method for hardware-in-the-loop test of a GPS/IMU integrated system on the ground. There are commonly unsolved difficult problems in the ground tests and laboratory hardware-in-the-loop tests of the coupled GPS/IMU integrated system on-board a vehicle such as aircraft, ship and car under GPS jamming environment.

In the ground test, since the vehicle is stationary, the inertial sensor in the GPS/IMU navigation system can not produce dynamic electronic signals for it is a self-contained device, and the GPS receiver can not output dynamic measurements. In other words, it is unable to test the accuracy and errors of a GPS/IMU integrated system installed on-board vehicle while it is stationary. It is also unable to test the accuracy and errors of a GPS/IMU integrated system installed on-board vehicle under various jamming environments while it is stationary. If the inertial sensor, the GPS receiver, and the GPS/IMU integrated system are installed on-board a ground vehicle such as a car, the tester can still process a motion test under real jamming conditions by actually driving the ground vehicle in relatively low cost. However, if the vehicle to be test is an aircraft, the cost and labors for actual-fly test are ultimately expensive.

In order to verify the correctness of the hardware and software elements and their anti-jamming capability of a fully coupled positioning system and/or to evaluate system performance on the ground or in the laboratory, the dynamic signals from the global positioning system receiver (GPSR) corrupted by jamming signals, gyros, and accelerometers are required to excite the fully coupled positioning system. The present invention relates to a Global Positioning System (GPS) and receiver jamming and anti-jamming simulation, and more particularly to a real time simulation method and system for jamming and anti-jamming evaluation of GPS/IMU (Inertial Measurement Unit) integrated system for a hardware-in-the-loop test on the ground.

The static test of a fully coupled positioning system under various jamming environments is easy where the actual inertial sensors and global positioning system receiver can be used and jammers are presented in the scene. The fully coupled positioning system is often installed on a moving platform, so that a dynamic test of the fully coupled positioning system is required before a mission. Obviously, the static method cannot be applied to the fully coupled positioning system dynamic test where the dynamic inertial measurements and global positioning system signals corrupted by jamming signals are required. Therefore, it is necessary that the essential parts of the gyros, accelerometers, and global positioning system receiver experience jamming and a trajectory identical to the expected mission for dynamic testing of the fully coupled positioning system.

The flight test provides a real environment for the fully coupled positioning system. A set of real flight tests is costly, and often not affordable during, the development of a fully coupled positioning system to meet predefined anti-jamming performance. Also, before the flight test, the fully coupled positioning system must go through a series of official tests. Thus, a real time hardware-in-the-loop simulation of a gyro, accelerometer, and a global positioning system receiver suffering various jamming signals is necessary during the development of a fully coupled positioning system, as well as for a fully coupled positioning dynamic test before a mission.

SUMMARY OF THE PRESENT INVENTION

It is an object of the present invention to provide a real time simulation method for jamming and anti-jamming evaluation of GPS systems and GPS/IMU integrated systems that renders the testing of the installed global positioning/inertial system on the vehicle can be carried out in a laboratory or in an anechoic chamber facility.

It is another object of this invention to provide a real time simulation method for jamming and anti-jamming evaluation of GPS systems and GPS/IMU integrated systems that generates dynamic gyro and accelerometer signals, and produces dynamic global positioning system receiver measurements corrupted by GPS jamming signals, under static conditions, identical to what would be encountered if the vehicle were flying. The present invention provides features supporting the development, debugging, and final integration of a GPS/IMU integrated system. It also assures testers that the global positioning/inertial integrated system on-board vehicle works properly before and during a flight test. It also helps to debug and evaluate on-board GPS/IMU integrated system under various jamming environments.

It is still another object of this invention to provide a real time simulation method for jamming and anti-jamming evaluation of GPS systems and GPS/IMU integrated systems in a real time hardware-in-the-loop static or dynamic test environment, which receives real time trajectory data from a 6DOF flight simulator and generates gyro electronic signals according to the gyro measurement model and error model, accelerometer electronic signals according to the accelerometer measurement model and error model, jamming signals according a jammer model, and dynamic global positioning system measurements according to the global positioning system model and the receiver model. The emulated dynamic electronic gyro and accelerometer signals and global positioning system receiver measurements corrupted by jamming signals are injected into the installed GPS/IMU integrated system to perform dynamic test of GPS/IMU integrated system on the ground under various jamming conditions.

It is a further object of this invention to provide a real time simulation method for jamming and anti-jamming evaluation of GPS systems and GPS/IMU integrated systems which allows unlimited dynamic test and performance evaluation of a GPS/IMU integrated system under various jamming conditions. With the gyro, accelerometer, jammer, and GPS receiver emulation method and system the testers are able to test the GPS/IMU integrated system performance over a real mission trajectory under various jamming scenarios.

It is still a further object of this invention to provide a real-time jamming and anti-jamming evaluation method and system that is efficiently utilized for ground test of installed system, laboratory hardware-in-the-loop dynamic simulation, and GPS/IMU integrated system analysis and development.

Another object of this invention is to provide a real time simulation method for jamming and anti-jamming evaluation of GPS systems and GPS/IMU integrated systems. In the simulated test, the reference trajectory is accurate and known, since it is defined by the testers, so that the high accuracy of the simulated method is very useful for the performance verification of the GPS/IMU integrated system under jamming conditions.

Another object of this invention is to provide a real time simulation method for jamming and anti-jamming evaluation of GPS systems and GPS/IMU integrated systems, which is adapted to predict and evaluate the dynamic performance of a GPS/IMU integrated system through a simulated test that can make the follow on real flight test safer and will greatly reduce the number of the real flight test. Consequently, the operation and test cost of the simulated method is low for it does not need the expensive motion device in the test system. The maintenance of the test system is simplified.

DETAILED DESCRIPTION OF THE PREFERRED EMBODIMENT

Figure 1:
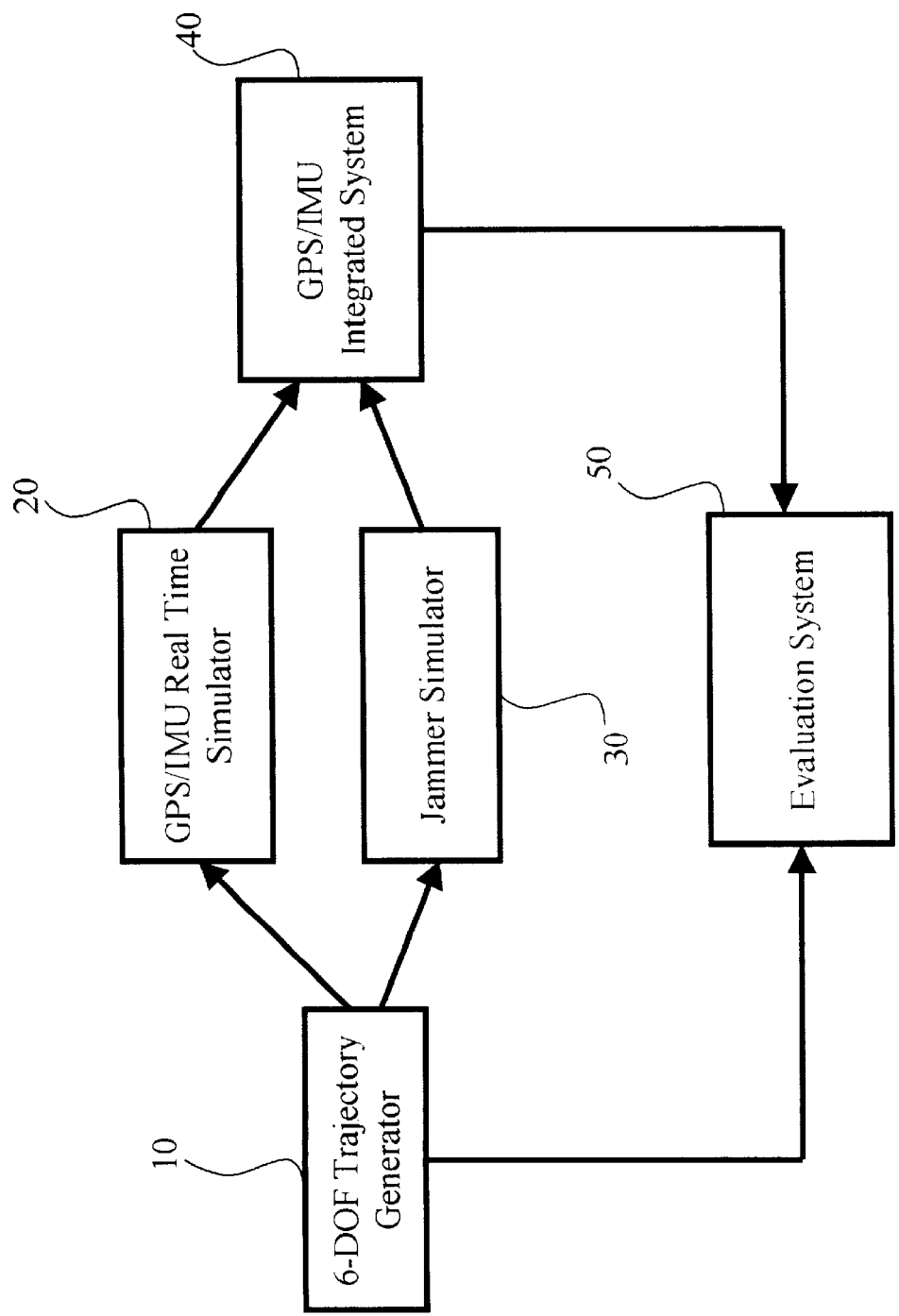
FIG. 1 is a block diagram illustrating an anti-jamming simulation and evaluation system equipped with a 6-DOF trajectory generator, an evaluation system, and a GPS/IMU integrated positioning system.

The present invention is based on advanced real time simulation, computation, and electronic technologies. A GPS model, an IMU model, and a jammer model are embedded in a host computer. The GPS model consists of a signal generator and two GPS receiver models. The signal generator is used to mimic the received intermediate frequency GPS signals. One GPS receiver model is a simplified model without tracking loop simulation, another model is a detailed model with models of correlators in a tracking loop. Either one has capability for GPS receiver dynamic performance simulation and jamming resistance performance simulation. The IMU model comprises a gyro model and an accelerometer model, and a group of gyro and accelerometer error models. The jammer model simulates the impact of the jamming signals on GPS receiver or GPS receiver model.

The jamming resistant margin of a GPS receiver can be determined from the processing gain of the receiver, the received signal level, and the signal-to-noise ratio.

The formula for calculating this margin is:

$$P_J = G_p - \lfloor L_{sys} + (S/N) \rfloor$$

where $L_{sys}$ is the total receiver loss in dB, $G_p$ is the processing gain which is defined as the ratio of the chip rate ($f_c$) to the data rate ($f_d$). Typical receiver loss is of the order of 1.5 to 2.5 dB. A commercial SPS GPS receiver has a processing gain 43 dB. Also, a (S/N) of approximately 16 dB is required in the carrier tracking loop to demodulate the 50 Hz navigation data. These figures lead to a jamming margin of 25 dB. The specified GPS signal power level is −160 dBW for a 0 dBi circularly polarized receiving antenna, the susceptibility threshold is estimated to be −135 dBW (i.e., −160 dBW+25 dB). This means that an interference signal with a power level of approximately 105 dBm at the GPS antenna would result in losing tracking of the GPS carrier phase. From this fact we can see how easy it is for a commercial GPS receiver to be jammed by RF interference.

Current GPS anti-jam technology utilizes multi-element antenna arrays with large antenna electronics. The initial tracking and suppression of a jamming signal is currently slow (>50 ms). This slow response to the jamming signal is inadequate for use by highly dynamic platforms. In addition to intentional jamming signals, highly dynamic maneuvers also lead to GPS signal loss due to large Doppler frequency shifts. Costliness is another shortcoming inherent with this anti-jamming technology.

The integration of a GPS receiver and an IMU provides another solution for anti-jamming. The anti-jamming improvement resulting from incorporating an IMU is due to the fact of that the GPS receiver suffers from loop bandwidth versus dynamic performance tradeoffs commonly encountered in tracking code and carrier phase-locked loops: the effects of noise increase with increasing loop bandwidth, while dynamic tracking errors increase with decreasing loop bandwidth. The IMU generated acceleration and velocity can be used to aid the tracking loops of a GPS receiver so that the bandwidth of the tracking loops can be narrowed to prevent the hostile jamming signal.

An anti-jamming simulation method and system is demanded to evaluate the anti-jamming capability and flounder of an anti-jamming technology or a system. An anti-jamming simulation and system is also needed for developing and tuning a GPS navigation system with ameliorated anti-jamming capability.

To process the a real time simulation method for jamming and anti-jamming evaluation of GPS systems and GPS/IMU integrated systems of the present invention, as shown in FIG. 1, a 6-DOF trajectory generator 10 is connected to a GPS/IMU real time simulator 20 and a jammer simulator 30. The outputs of the GPS/IMU real time simulator and the jammer simulator are directly injected into a GPS/IMU integrated system 40. An evaluation system 50 is connected between the 6-DOF trajectory generator 10 and the GPS/IMU integrated system 40.

The real time simulation method for jamming and anti-jamming evaluation of GPS systems and GPS/IMU integrated systems according to the present invention comprises following steps:

1. The trajectory profile data in the 6-DOF trajectory generator 10 is converted into 28 motion parameters, including time, position, velocity, acceleration vector, rotation matrix, angular velocity, and angular acceleration.
2. The 6-DOF trajectory generator 10 outputs 28 parameters to the GPS/IMU real time simulator 20 via an Ethernet Network NE2000 card. These parameters drive the GPS/IMU real time simulator 20 to generate the GPS signal and the inertial measurements corrupted with errors.
3. The jammer simulator 30 receives the jamming command from the trajectory profile and simulates the jamming effect on the GPS signal and measurements. The simulated jamming signals are directly injected into the GPS/IMU integrated system 40.

The GPS/IMU real time simulator 20 outputs inertial measurements and GPS data to the GPS/IMU integrated navigation system via 2 RS-232 serial ports.

The evaluation system 50 collects the navigation solution from the GPS/IMU integrated navigation system 40 and the true trajectory from the 6-DOF trajectory generator 10 to perform navigation accuracy analysis and anti-jamming performance evaluation.

The GPS/IMU REALTIME SIMULATOR™ (RTGIS) is an emulation computer system capable of simulating GPS receivers and IMUs. It is ideal low-cost equipment for the hardware-in-the-loop ground test of GPS/IMU navigation systems. The RTGIS receives real-time flight trajectory data from a 6-DOF flight trajectory generator, and sends out GPS measurements for all in-view satellites and IMU data, including three gyro and three accelerometer outputs. It is able to output these sensor data at multiple rates and through different ports, such as RS-232, RS-422/485, 1553, ARINC-429, etc. The GPS/IMU REALTIME SIMULATOR™ is a commercial product from American GNC Corporation. The present invention will enhance the simulation and test capability of the GPS/IMU REALTIME SIMULATOR™ by adding the anti-jammer simulation functions.

Figure 2:
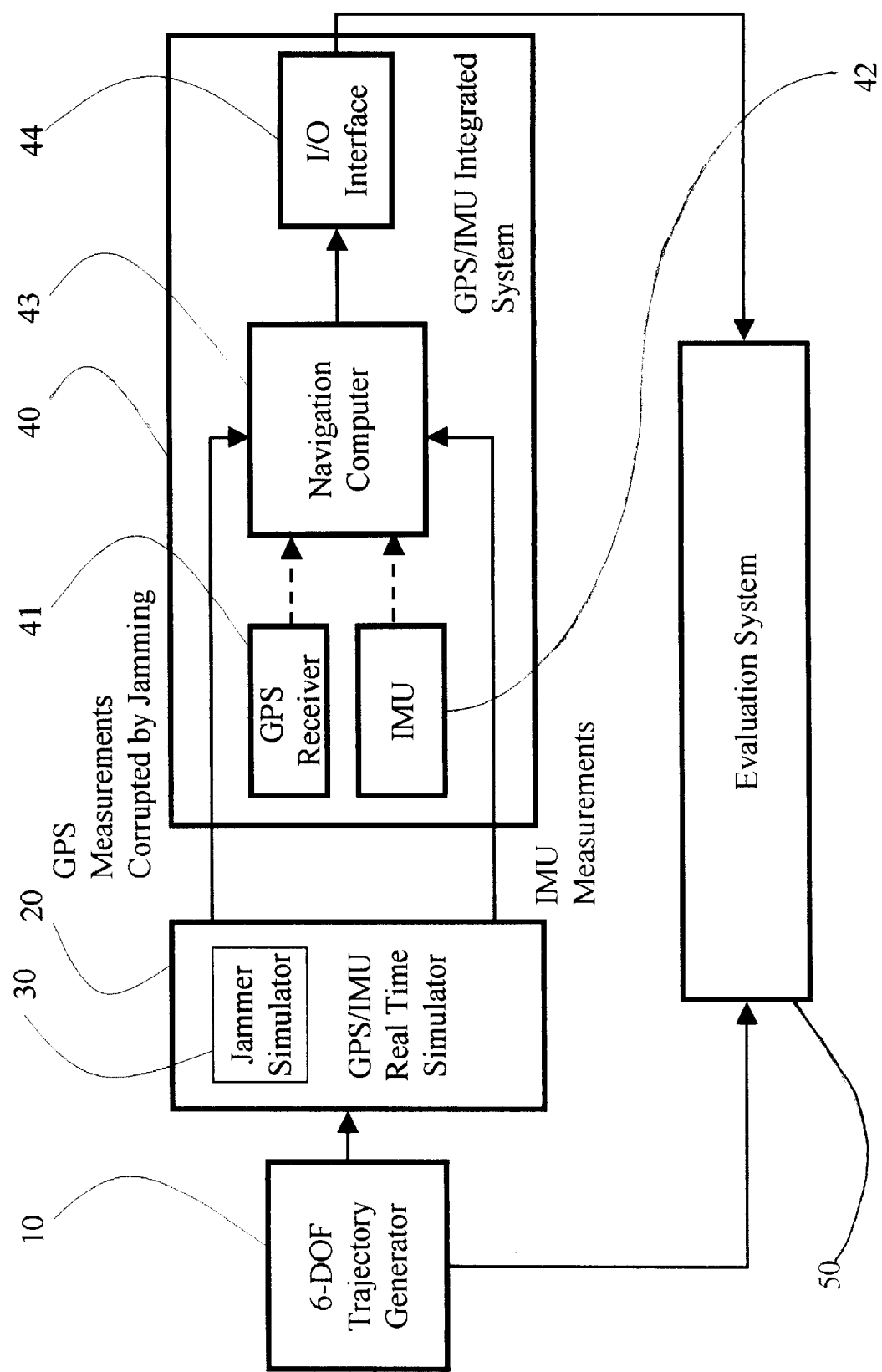
FIG. 2 is a block diagram illustrating an anti-jamming simulation and evaluation system equipped with a 6-DOF trajectory generator, an evaluation system, and a GPS/IMU integrated positioning system, where the jamming simulator is a part of the GPS/IMU real time simulator.

FIG. 2 shows a block diagram illustrating an anti-jamming simulation and evaluation system equipped with a 6-DOF trajectory generator, an evaluation system, and a GPS/IMU integrated navigation system. The 6-DOF trajectory generator 10 is connected to the GPS/IMU real time simulator 20 and the evaluation system 50. The jammer simulator 30 is a part of the GPS/IMU real time simulator 20. The outputs of the GPS/IMU real time simulator are IMU measurements and GPS measurements corrupted by jamming signals and and directly injected into a GPS/IMU integrated system 40. The GPS/IMU integrated system is connected to the evaluation system 50.

The real time simulation method for jamming and anti-jamming evaluation of GPS systems and GPS/IMU integrated systems according to the present invention comprises the following steps:

1. Input IMU measurement models and IMU error models into the GPS/IMU real time simulator 20 according to a real IMU device 42 of the GPS/IMU integrated system 40 to be tested. The IMU measurement models comprise gyro measurement model and accelerometer measurement model, which are determined by an inertial sensor principal. The IMU error models comprises gyro error model and accelerometer error model which are defined by a user according to the real IMU device 42 used in the GPS/IMU integrated system 40 to be tested.
2. Input jammer models into the jammer simulator 30 of the GPS/IMU real time simulator 20. The jammer model is determined by jammer location, jammer type, jammer source power, and platform location.
3. Produce real time trajectory data from the 6DOF trajectory generator 10 and send the real time trajectory data to the GPS/IMU real time simulator 20. The real time trajectory data are defined by the user. The GPS/IMU real time simulator 20 produces IMU signals and dynamic GPS measurements corrupted by jamming signals as if a vehicle is really moving along a trajectory defined by the user.
4. Generate output data including real time IMU data, identical to the real IMU device in a designed mission, by the IMU model of the coupled real time GPS/IMU emulation system 20, and the GPS measurements corrupted by jamming signals by the GPS receiver model and jammer model in the GPS/IMU real time simulator 20.
5. Format the GPS measurement data and convert the real time IMU data into IMU simulated electronic signals by an IMU signal generator in the GPS/IMU real time simulator 20. The IMU signal generator is in fact an interface board in an emulation computer provided in the GPS/IMU real time simulator 20. The IMU signal generator produces the IMU simulated electronic signals that are identical to those produced by the real IMU device 42 in the GPS/IMU integrated system 40.
6. Process the simulated GPS measurements corrupted by simulated jamming signals and generated IMU simulated electronic signals by a standard interface and a regulator and connector circuit to form suitable electrical specifications and connector pin arrangement that is compatible to the GPS/IMU integrated system 40.
7. Inject the simulated GPS measurements corrupted by jamming signals and the IMU simulated electronic signals into the GPS/IMU integrated system 40. When the GPS/IMU integrated system 40 is excited in dynamic operation, a performance thereof is able to be tested and evaluated as if carrying a real transportation/flight test.
8. Collect test data from the GPS/IMU integrated system 40, during the test, by an evaluation system 50 which includes a computer. Usually the comparison between the reference 6DOF trajectory data and the integrated GPS/IMU resolved vehicle trajectory data is done to determine whether the integrated GPS/IMU system 40 works properly under various jamming conditions and to evaluate its performance.

The 6-DOF trajectory generator provides the platform's 3-dimensional position, 3-dimensional velocity, and 3-dimensional attitude information, as well as the jamming data, such as the jammer location, type, and power. The jammer data can be also provided in a file residing on the jammer simulator. Defining the jammer data by user through an interactive interface is the third alternative for injecting the jammer data.

The basic 28 parameters from the 6-DOF trajectory generator 10 form the state vector and are defined as follows:
a) Time Tag in milliseconds.
b) Three dimensional location in Geodetic coordinate system, including Latitude in radian, Longitude in radian, height above sea level in meters.

c) Three dimensional location in earth-centered inertial coordinate system (ECIZ).

d) Three dimensional velocity in earth-centered inertial coordinate system.

e) Three dimensional acceleration in earth-centered inertial coordinate system.

f) Rotation matrix from the earth-centered inertial coordinate system to the body coordinate system (BC).

g) Three dimensional angular velocity in radians/second when observer is in earth-centered inertial coordinate system and resolution is in body coordinate system.

h) Three dimensional angular acceleration in radians/second$^2$ when observer is in earth-centered inertial coordinate system and resolution is in body coordinate system.

The information in the state vector is sufficient for simulating any motion of the flight vehicle with high fidelity. The benefit of using 28 parameters, some of which are redundant, is that no differentiation and integration computations are performed in the RTGIS. A sophisticated IMU model and GPS model are used in the RTGIS to generate inertial data and GPS measurements in real time.

Interference increases the GPS signal jitter, and the positioning accuracy is degraded. With increasing power of the interference, loss of GPS signal tracking might occur. The degraded navigation solution from the GPS/IMU integrated system 40 is collected by the evaluation system 50. The evaluation system 50 also gathers ideal data from the 6-DOF trajectory generator 10 and performs comparison between the ideal trajectory data and the navigation data resolved by the GPS/IMU integrated system 40. Thus the GPS/IMU integrated system performance could be evaluated.

Figure 3:
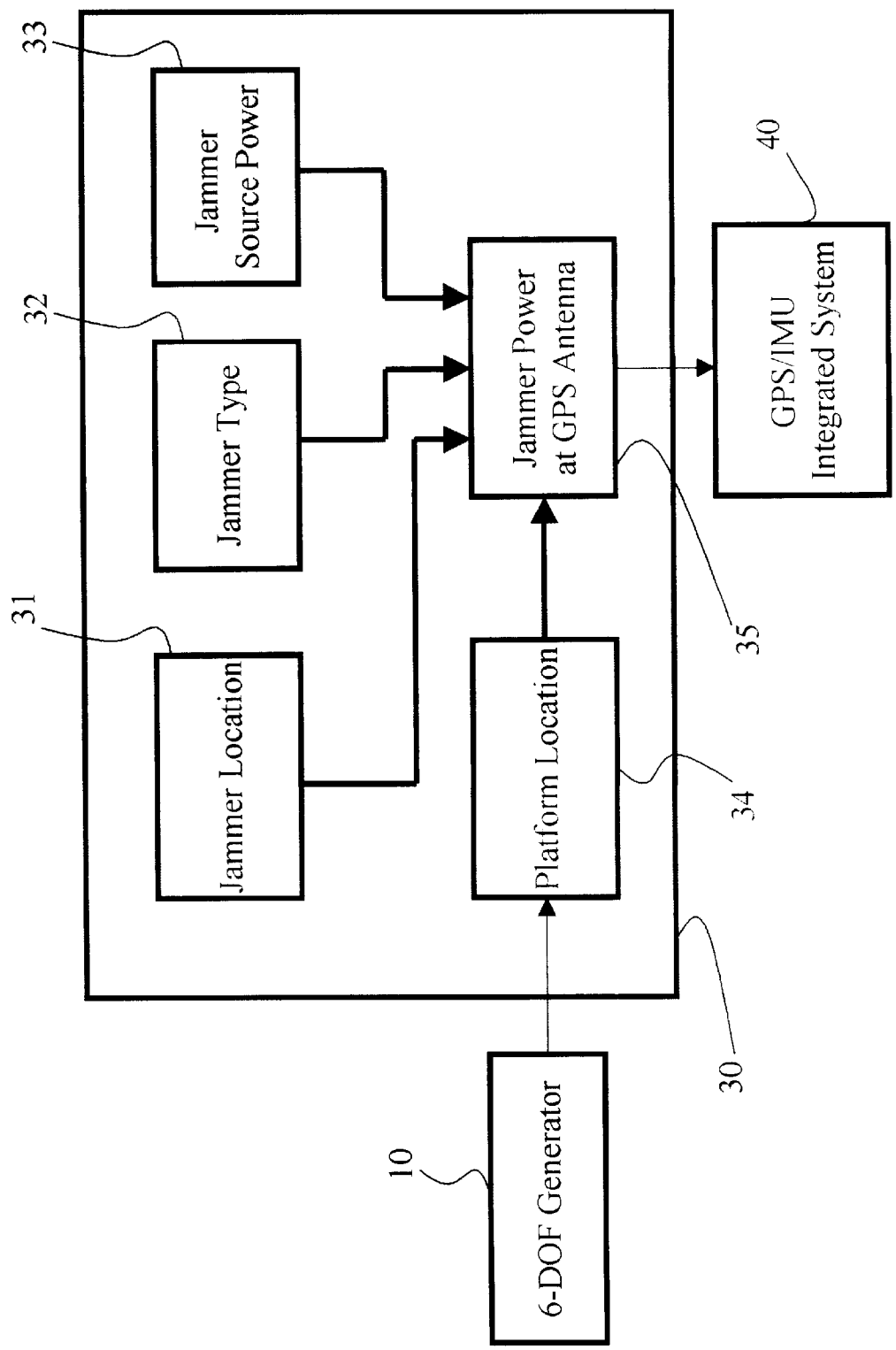
FIG. 3 is a block diagram illustrating the jamming simulator according to the preferred embodiment of the present invention.

FIG 3 is a block diagram illustrating the jamming simulator according to the preferred embodiment of the present invention. The jammer simulator 30 comprises of a jammer location module 31, a jammer type module 32, a jammer source power module 33, a platform location module 34, and a jammer power at GPS antenna module 35.

The platform location module 34 receives the trajectory data from the 6-DOF trajectory generator 10 and is responsible for providing the location data of the GPS/IMU integrated system carrier at different time. For a more sophisticated simulation, the attitude information of the platform is also incorporated to simulate the impact of jamming signals on the GPS/IMU integrated system.

The jammer location module 31 provides the location data of the jammer. The jammer location and the platform location together determine the range between the jammer and the GPS/IMU integrated navigation system which is very import to determine the impact of the jammer signals on the GPS/IMU integrated navigation system. The jammer can be either at a fixed location or in motion. For example, a jammer can be installed on a tower, thus at a fixed station. A jammer can also been installed on a moving balloon or aircraft to maximize its impact to GPS related navigation system. For a fixed location jammer, its location can be read from a file or easily input by a user who performs the dynamic hardware-in-the-loop GPS/IMU integrated system test under different jamming conditions. For a moving jammer, its trajectory could be identified. A jammer trajectory data with time tag is stored on the simulation computer and the jammer location module 31 reads the trajectory data from this file.

The jammer type module 32 provides options for the user to identify different type of jammers, including continuous wave (CW) jammer and wide-band jammer. The CW jamming signal has only one frequency and can be easily cancelled by incorporating a frequency cancellation processing in a GPS receiver. The wide-band jamming signal spends cross a wide frequency spectrum and is difficult to remove its impact. The techniques for canceling wide-band jamming signals include multi-antenna coupled with digital beam forming (DBF).

The jammer source power module 33 defines the jammer power which is another very import factor in the jamming and anti-jamming simulation. The jammer source power can be easily input by a user who performs anti-jamming test and evaluation. The jammer source power can be either constant or variable with respective to time.

The jammer power at GPS antenna module 35 collects platform location data from the platform location module 34, the jammer location data from the jammer location module 31, the jammer type data from the jammer type module 32, and the jammer power from the jammer source power module 33 to determine the jamming effect at the GPS receiver antenna. The jamming effect is then injected into the GPS/IMU integrated system.

The received GPS signal with jamming is given by $$r(t) = \sqrt{Pc}(t-T)\cos[(\omega_0+\Delta\omega)(t-T)+\phi_0]+n(t)+J(t)$$

Where P is the average signal power, c(t) is the spreading code with code rate $R_c$, T is propagation delay time of the channel, n(t) is additive colored noise, and J(t) is the jamming signal.

Figure 4:
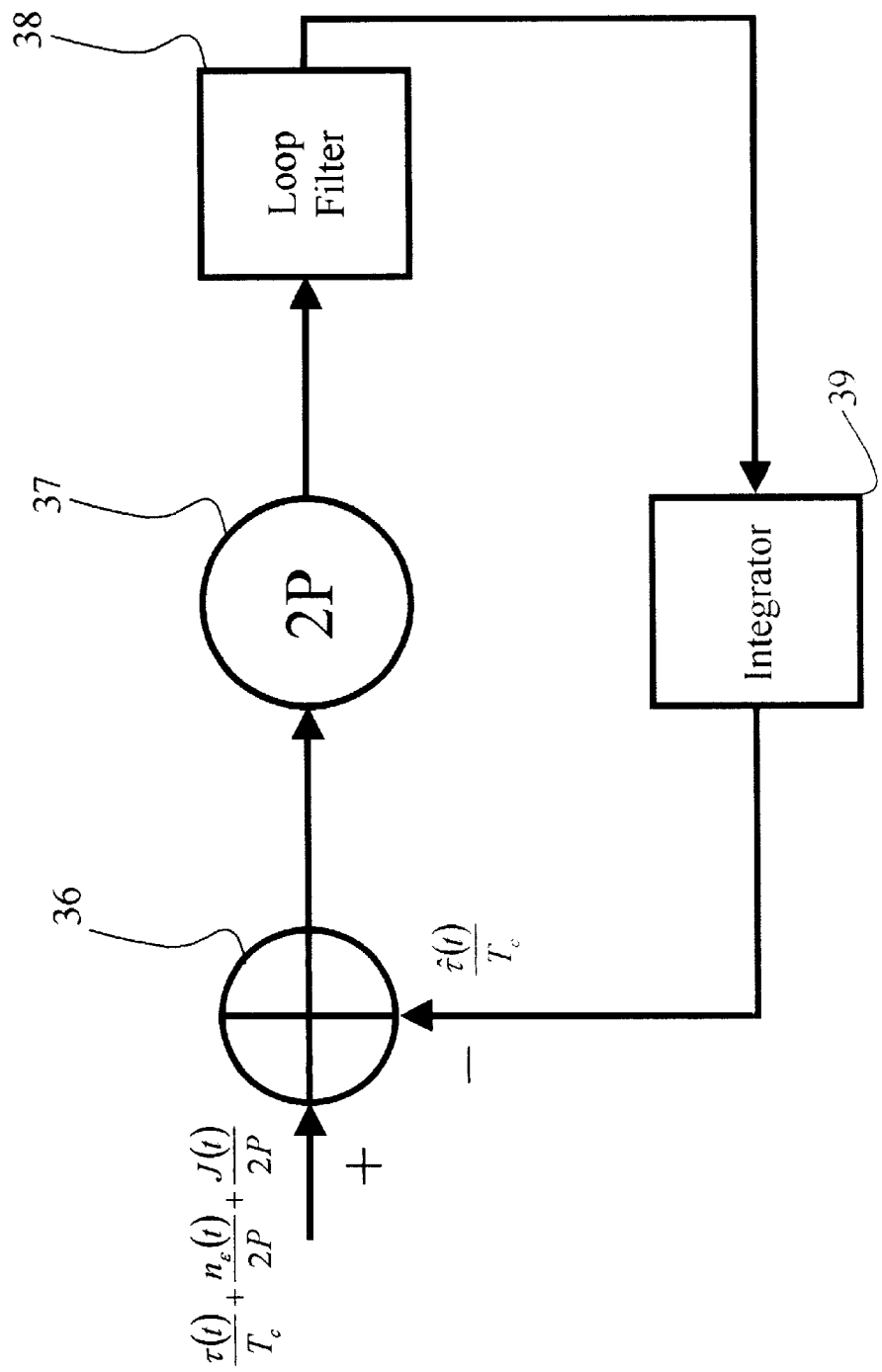
FIG. 4 is a block diagram of the tracking loop of a GPS receiver under jamming condition.

The non-coherent delayed lock loop (NCDLL) of a GPS receiver is modeled by FIG. 4. The jamming and receiver noises are also shown in this figure.

Denote the s-domain transfer function of the loop filter as F(s), the NCDLL closed-loop transfer function is given by $$H(s) = \frac{\hat{\tau}(s)}{\tau(s)} = \frac{2PKF(s)}{s+2PKF(s)}$$

An instance of an F(s) is an active lead-lag filter of the form $$F(s) = \frac{1+\tau_2 s}{\tau_1 s}$$

The above equation is also noted as a type II loop filter. Type refers to the number of poles located at zero. The closed-loop transfer function can now be rewritten as $$H(s) = \frac{2\zeta\omega_n s + \omega_n^2}{s^2 + 2\zeta\omega_n s + \omega_n^2}$$

where $\omega_n$ is the loop natural frequency in rad/sec given as $$\omega_n = \sqrt{\frac{2PK}{\tau_1}}$$

and $\zeta$ is the loop-damping factor given as $$\zeta = \frac{\tau_2}{2}\omega_n$$

The single-sided noise equivalent bandwidth of the loop, $B_L$ (in Hz), can be shown to be $$B_L = \frac{1}{2}\int_{-\infty}^{+\infty} |H(j2\pi f)|^2 df = \frac{1}{2}\omega_n\left(\zeta + \frac{1}{\zeta}\right)$$

The power spectrum of the tracking jitter introduced by the jammer is denoted as $G_J(\omega)$, and is given by $$G^\delta(\omega)=|H(j\omega)|^2 J(\omega)/4P^2$$

where $J(w)$ is the power spectrum of the jamming signal. This noise PSD is approximately flat over the relatively small loop bandwidth; therefore, the tracking sleaze introduced by the jammer can be written as:

$$\sigma_J^2 = \frac{1}{2\pi}\int_{-\infty}^{\infty} G_J(\omega)\,d\omega = \frac{J(0)}{2P^2}B_L$$

Where $B_L$ is the tracking loop bandwidth in Hz. The above equation becomes the basis of the jamming effect simulation of the present invention.

The carrier-to-noise ratio $C/N_0$ impacts the GPS tracking loops and thus dominates the accuracy of the measured pseudorange and pseudorange rate values. That the positioning errors are a function of the carrier to noise ratio, $C/N_0$, ensues. The power density, i.e. watts per unit frequency, is often used to characterize the bandlimited white noise. Thus the carrier to noise ratio, $C/N_0$, can be defined as the ratio of the power of the signal to the power density of the noise. A new ratio, the signal-to-noise ratio, is defined to account for the frequency spread of the noise power. The signal-to-noise ratio is the ratio of the power of the signal to the total power contributed by the noise i.e $S/N_0 = C/(N_0 * B)$ where B is the bandwidth.

The carrier to noise ratio and the signal to noise ratio are used in the present invention to characterize a receiver's performance under jamming conditions. If the jamming power and its frequency content are known, then their effect can be translated to an equivalent noise degradation of the $C/N_0$ ratio which, in turn, directly impacts a receiver's performance characterization.

The carrier to noise power ratio ($C/N_0$) will be deteriorated due to the introduction of the in-band radio frequency interference on a GPS receiver channel. The carrier tracking threshold is a carrier to noise ratio level, at which the GPS receiver channel loses tracking of signals due to radio jamming noise. The better anti-jamming performance a GPS receiver has, the lower carrier tracking threshold is. The distance between the unjammed $C/N_0$ and the carrier tracking threshold is used as a measure of the anti-jamming performance of a GPS receiver in the present invention.

The effective signal-to-noise density S/NO, when considering jamming, is given by $$\frac{S}{N_0} = \frac{S}{N_{0T}} + \frac{s}{N_{0J}} (dB/Hz)$$

where $N_{0T}$ is the spread thermal noise density and $N_{0J}$ is the spread jamming noise density.

The density of jamming noise at the output of the correlator is the convolution of the jamming noise spectral density and the spectral density of the reference PRN code generated in the GPS receiver:

$$N_{0J}(f) = \int_{-\infty}^{\infty} S_C(f')S_J(f-f')\,df'$$

where $S_C(f)$ is the spectral density of the reference PRN code and $S_J(f)$ is the spectral density of the jamming noise.

The introduction of the pre-correlation filtering, which is to prevent aliasing while sampling in a GPS receiver, let the noise including jamming signal bandlimited at intermediate frequency (IF). The spectral density of wide- and narrow-band jamming noise at IF can be represented as:

$$S_J(f) = \frac{P_J}{f_u - f_l}; \quad f_l \leq f \leq f_u$$

where $f_u$ and $f_l$ are the upper and lower frequency limits, respectively; and $P_J$ is the total jamming noise power. After the correlation processing in a GPS receiver, the spectral density of the jamming noise is $$N_{0J}(f) = \frac{P_J}{f_u - f_l} \int_{\max[-B_I/2, f-f_l]}^{\min[B_I/2, f-f_u]} S_C(f')\,df'$$

where $B_I$ is the IF bandwidth. CW interference has a spectral density of the following form:

$$S_J(f) = P_J \delta(f-f_J)$$

where $f_J$ is the frequency of the jammer. Thus, the post correlation noise density is $$N_{0J}(f) = P_J S_C(f-f_J)$$

The jammer-to-signal (J/S) ratio can be computed using the following formula $$\frac{J}{S} = \frac{\frac{P_J}{4\pi R^2} A G_J(az_J, el_J) G_S(az_J, el_J)}{P_S G_S(az_S, el_S)}$$

where, $$\frac{J}{S} = \text{Jammer-to-signal power ratio;}$$

$P_J$=Jammer power (watts); A=Effective GPS antenna aperture area $$\left(= \frac{c^2}{4\pi f^2}, m^2\right),$$

f is L1 or L2; R=Range to jammer (m); $P_S$=GPS signal power at antenna (watts); $G_J(az_J, el_J)$=Jammer gain in the GPS receiver direction; $G_S(az_J, el_J)$=GPS antenna gain in the jammer direction; $G_S(az_S, el_S)$=GPS antenna gain in satellite direction.

The carrier-to-noise power ratio in the absence of jamming and interference is given by $$C/N_0 = \frac{P_S}{kT_{sys}}$$

where, $P_S$=GPS signal power at antenna (watts); k=Boltzman's constant (=$1.38 \times 10^{-23}$ watt-sec/degK); $T_{sys}$=Effective system temperature in degrees Kelvin.

The carrier-to-noise power ratio in the presence of jamming and interference is given by $$C/N_0 = \frac{P_S}{kT_{sys} + J}$$

where $$J = \frac{P_J}{4\pi R^2} A G_J(az_J, el_J) G_S(az_J, el_J).$$

Denoting the processing gain for the jammer as PG, the above equation can be rewritten as $$C/N_0 = \frac{P_S}{kT_{sys} + J/PG}$$

The jammer-to-signal ratio can also be measured according to the following equation:

$$\frac{J}{S} = PG\left[\frac{1}{C/N_0} - \frac{kT_{sys}}{S}\right]$$

What is claimed is:

1. A real time simulation method for jamming and anti-jamming evaluation of GPS systems and GPS/IMU integrated systems, comprising steps of:
    (a) converting a trajectory profile data in a 6-DOF trajectory generator into a plurality of motion parameters, including time tag, position vector, velocity vector, acceleration vector, rotation matrix, angular velocity vector, and angular acceleration vector;
    (b) outputting said motion parameters from said 6DOF trajectory generator to a GPS/IMU real time simulator via an Ethernet Network NE2000 card; wherein said motion parameters driving said GPS/IMU real time simulator to generate GPS signal and the inertial measurements corrupted with errors;
    (c) receiving a jamming command from said trajectory profile and simulating jamming signals; wherein said simulated jamming signals are directly injected into a GPS/IMU integrated system;
    (d) outputting said inertial measurements and GPS data from said GPS/IMU real time simulator to said GPS/IMU integrated navigation system;
    (e) collecting a plurality of navigation solutions from said GPS/IMU integrated navigation system and a true trajectory from said 6-DOF trajectory generator to perform navigation accuracy analysis and anti-jamming performance evaluation.

2. A real time simulation method for jamming and anti-jamming evaluation of GPS systems and GPS/IMU integrated systems, comprising the steps of:
    (a) inputting IMU measurement models and IMU error models into a GPS/IMU real time simulator according to a real IMU device of a GPS/IMU integrated system to be tested, wherein said IMU measurement models comprise gyro measurement model and accelerometer measurement model which are determined by inertial sensor principles, and that said IMU error models comprises gyro error model and accelerometer error model which are defined by a user according to said real IMU device used in said GPS/IMU integrated system to be tested;
    (b) inputting jammer models into a jammer simulator of said GPS/IMU real time simulator; wherein said jammer model is determined by a jammer location, a jammer type, a jammer source power, and a platform location;
    (c) producing real time trajectory data from said 6DOF trajectory generator and send said real time trajectory data to said GPS/IMU real time simulator and said jammer simulator of said GPS/IMU real time simulator, wherein said jammer simulator produces jamming signals according to said jammer model defined by said user, wherein said real time trajectory data are defined by said user and said GPS/IMU real time produces dynamic GPS measurements corrupted by said jamming signals and IMU signals as if a vehicle is really moving along a trajectory defined by said user, and as if said GPS/IMU integrated system is suffering a real jamming condition;
    (d) generating output data including real time IMU data by said IMU model of said GPS/IMU real time simulator, and said GPS measurements corrupted by said jamming signals by said GPS receiver model in said GPS/IMU real time simulator and said jammer model in said jammer simulator;
    (e) formatting said GPS measurement data corrupted by said jamming signals and converting said real time IMU data into IMU simulated electronic signals by an IMU signal generator in said GPS/IMU real time simulator, wherein said IMU signal generator is an interface board in an emulation computer provided in said GPS/IMU real time simulator;
    (f) processing said simulated GPS measurements corrupted by said jamming signals and generated IMU simulated electronic signals by a standard interface and a regulator and connector circuit to form suitable electrical specifications and a connector pin arrangement that is compatible to said GPS/IMU integrated system; and
    (g) injecting said simulated GPS measurements corrupted by said jamming signals and said IMU simulated electronic signals into said GPS/IMU integrated system, wherein when said GPS/IMU integrated system is excited in dynamic operation, a performance under various jamming conditions thereof is able to be tested and evaluated as if carrying a real transportation test under a real jamming environment.

3. A real time simulation method for jamming and anti-jamming evaluation of GPS systems and GPS/IMU integrated systems, as recited in claim 2, after the above step (g), further comprising an additional step of collecting test data from said GPS/IMU integrated system by a evaluation system connected between said 6DOF trajectory generator and said GPS/IMU integrated system, so as to compare said real time trajectory data from said 6DOF trajectory generator with integrated GPS/IMU resolved vehicle trajectory data output from said GPS/IMU integrated system under jamming condition in order to determine whether said GPS/IMU integrated system works properly and to evaluate the navigation performance thereof under various jamming conditions.

4. A real time simulation method for jamming and anti-jamming evaluation of GPS systems and GPS/IMU integrated systems, as recited in claim 2, wherein outputs of said GPS/IMU real time simulator is directly injected into said GPS/IMU integrated system through bypassing an real GPS receiver and a real IMU device in said GPS/IMU integrated system, said real time simulation method for jamming and anti-jamming evaluation of GPS systems and GPS/IMU integrated systems comprising:
    an interface board including a GPS emulation input/output interface and an IMU emulation input/output interface;
    an emulation computer comprising a jammer emulation module for producing jamming signals, a GPS emulation module for performing GPS emulation, and an IMU emulation module for performing IMU emulation, jammer emulation module receiving said real time trajectory data from said 6DOF trajectory generator and generating dynamic jamming signals, said GPS emulation module receiving said real time trajectory data from said 6DOF trajectory generator and generating dynamic GPS measurements including pseudoranges, carrier phases, and Doppler shifts, and positioning information including location information and velocity information, said dynamic GPS measurements being formatted to simulated GPS measurements and sent out through said GPS emulation input/output interface to said GPS/IMU integrated system, wherein said velocity information from said GPS/IMU integrated system is sent through said GPS emulation input/output interface to said GPS simulation module for GPS tracking loop aiding to facilitate said GPS/IMU integrated system, said IMU emulation module receiving real time trajectory data from said 6DOF trajectory generator and producing IMU simulated measurements, said IMU emulation input/output interface projecting said IMU measurements into specific simulated electrical signals; and a signal regulator and connector board for converting electronic signals from said IMU emulation input/output interface into simulated electrical signals, wherein said simulated electrical signals, coupled with said simulated GPS measurements corrupted by said jamming signals, are injected into said GPS/IMU integrated system which causes an on-board GPS/INS navigation computer installed therein into working as if carrying real transportation test under real jamming environment.

5. A real time simulation method for jamming and anti-jamming evaluation of GPS systems and GPS/IMU integrated systems, as recited in claim 2, wherein said jammer simulator comprising of:

a jammer location module for receiving said trajectory data from said 6-DOF trajectory generator and providing the current location data of said GPS/IMU integrated system carrier at different time; wherein for a more sophisticated simulation, the attitude information of said GPS/IMU integrated system carrier is also incorporated to simulate the impact of jamming signals on said GPS/IMU integrated system;

a jammer location module for providing the current location data of one or more jammers; wherein said jammer location and said GPS/IMU integrated system carrier location together determining a range between said jammers and said GPS/IMU integrated system carrier which is very import to determine the impact of the jammer signals on the GPS/IMU integrated navigation system;

a jammer type module for providing options for a user to identify different type of jammers, including continuous wave (CW) jammer and wide-band jammer; wherein said CW jammer emitting jamming signal on one carrier frequency and can be easily cancelled by incorporating a frequency cancellation processing in a GPS receiver; wherein said wide-band jammer emitting jamming signal spending cross a wide frequency spectrum and is difficult to remove its impact;

a jammer source power module for defining a jammer power which is another very import factor in the jamming and anti-jamming simulation; wherein said jammer source power can be easily input by a user who performs anti-jamming test and evaluation; wherein said jammer source power can be either constant or variable with respective to time;

a jammer power at GPS antenna module for collecting GPS/IMU integrated system carrier location data from said platform location module, said jammer location data from said jammer location module, said jammer type data from said jammer type module, and said jammer power from said jammer source power module to determine the jamming effect at a GPS receiver antenna; said jamming effect is then injected into the GPS/IMU integrated system.

6. A real time simulation method for jamming and anti-jamming evaluation of GPS systems and GPS/IMU integrated systems, as recited in claim 5, wherein said jammer simulator comprising of a location-fixed jammer simulation; wherein said jammer location is read from a file or is input by a user who performs the dynamic hardware-in-the-loop GPS/IMU integrated system test under different jamming conditions.

7. A real time simulation method for jamming and anti-jamming evaluation of GPS systems and GPS/IMU integrated systems, as recited in claim 5, wherein said jammer simulator comprising of a location-variable jammer simulation; wherein said jammer location is defined by a trajectory data file that is stored on the simulation computer.

* * * * *